United States Patent

Mullen et al.

[15] 3,649,356

[45] Mar. 14, 1972

[54] ELECTRICAL INSULATING-LAYER PROCESS

[72] Inventors: Lewis O. Mullen; Donald B. Sullivan, both of Boulder, Colo.

[73] Assignee: The United States of America as represented by the Administrator of the National Aeronautics and Space Administration

[22] Filed: Dec. 31, 1969

[21] Appl. No.: 889,682

[52] U.S. Cl. ..................................117/217, 29/599, 117/62, 117/93.16 D, 117/107, 117/211

[51] Int. Cl. ......................................B44d 1/14, B44d 1/18

[58] Field of Search..................117/217, 227, 213, 106, 107, 117/62, 93.16 D, 211; 338/32 S; 29/599, 195

[56] References Cited

UNITED STATES PATENTS

| | | | |
|---|---|---|---|
| 3,113,889 | 12/1963 | Cooper et al. | 117/227 X |
| 3,447,961 | 6/1969 | Hitchcock | 117/106 X |

FOREIGN PATENTS OR APPLICATIONS

| | | | |
|---|---|---|---|
| 681,287 | 3/1964 | Canada | 117/93.16 D |

*Primary Examiner*—Alfred L. Leavitt
*Assistant Examiner*—C. K. Weiffenbach
*Attorney*—N. T. Musial, G. E. Shook and G. T. McCoy

[57] ABSTRACT

A first electrical conductor body is cooled to below 100° K. in a vacuum chamber. The chamber is then pressurized with oxygen and after a period of time a glow discharge is established in the chamber. After a time the glow discharge is terminated, the chamber is evacuated and a second electrical conductor material is deposited on the first body. Both bodies are then heated to ambient temperature.

As optional steps the first conductor may be heated to below 0° . and recooled to below 100° K. before depositing the second conductor body.

17 Claims, No Drawings

ELECTRICAL INSULATING-LAYER PROCESS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to quantum mechanical tunneling electrical devices and is directed more particularly to a method for forming an insulating layer between a pair of electrical conductors.

In the electrical art, it is often desired to provide a tunneling insulating layer between layers of electrical conductor or semiconductor material. In the past, such insulating layers have been formed by oxidizing the surface of one of the conductors to form an insulating layer and then depositing another conductor layer over the insulating layer. However, a problem arises in that the oxides of some metals suitable for use as conductors are themselves conductive. For example, niobium is a highly desirable material for use as one of the conductor layers in superconductive tunneling devices. Unfortunately, the lowest oxide of niobium is not an insulator but is, in fact, a superconductor. Accordingly, when forming an insulating layer between electrical conductors, conductive oxides must be excluded or some barrier material other than oxides must be utilized if undesirable background currents are to be avoided.

Other objectionable characteristics of prior art insulating layers include lack of uniformity, presence of pinholes and lack of long term stability, particularly when subjected to thermal cycling over a relatively wide temperature range.

OBJECTS OF THE INVENTION

In view of the foregoing, it is an object of the invention to provide an improved quantum mechanical tunneling layer between adjacent conductor or semiconductor materials and a method for forming said insulating layer.

It is another object of the invention to provide an electrical insulating layer which is uniform in thickness, free from pinholes and stable in spite of thermal cycling over a wide temperature range.

It is still another object of the invention to provide a method of forming an electrical insulating layer between conductors which do not deteriorate significantly in the atmosphere but which have rarely been used in the past because of difficulties in fabricating an acceptable tunneling layer.

It is yet another object of the invention to provide a method of fabricating a quantum mechanical tunneling layer about 10 angstroms thick between conductors, which method yields accurate, positive control over parameters such as the thickness of the tunneling layer.

In summary, the invention provides a quantum mechanical tunneling layer between electrical conductors, which layer contains substantially no conductive compounds or oxides and a method for fabricating such a layer. The layer if formed by causing a reactive gas such as oxygen to partially impregnate or to be adsorbed on the surface of a first conductor at liquid nitrogen temperature. A second electrical conductor which will react with the adsorbed gas to form an electrical insulator is deposited on the first conductor at liquid nitrogen temperature. Both conductors are then heated to ambient temperature causing the adsorbed gas to react with the second conductor to form an electrical insulating layer.

DESCRIPTION OF THE PREFERRED EMBODIMENT

As used in the following description of the invention, electrical conductor is intended to include those materials which are classified as semiconductors in the electrical art.

As an example of the invention, a substrate body or bodies are attached to the underside of a substrate holder block disposed in a stainless steel chamber which is connected to a suitable vacuum pump. The holder block is provided with a heater coil and with coolant passages so that its temperature may be controlled as desired. A vessel containing niobium and a vessel containing lead are disposed in the bottom of the vacuum chamber, each of the vessels being provided with electrical heating means so that either the niobium or the lead may be severally and selectively vaporized. A metal mask having the desired pattern of the first conductor to be deposited on the substrate is positioned immediately below the substrate and includes a control arm extending to the exterior of the vacuum chamber. Below the mask there is disposed a shutter which is also controlled from outside the vacuum chamber.

To carry out the method of the invention, the vacuum chamber is evacuated to a vacuum at least $7\times10^{-8}$ torr. The substrate which may be sapphire or any other suitable electrically nonconducting material, such as glass, are heated to a temperature between about 350° C. and about 500° C. by means of the heating coil in the holder block. The vessel containing the niobium is then heated to cause evaporation thereof. When the rate of deposition of the niobium on the substrates reaches about 3 to 10 angstroms per second, the shutter in the vacuum chamber is opened allowing the niobium to be deposited on the substrate. It will be understood by those skilled in the art, that the niobium source may be outgassed before and after evaporation of the niobium has begun.

After the desired thickness of niobium has been deposited on the substrate, the shutter is closed and the evaporation of the niobium is terminated after which the substrates are cooled to ambient temperature. Liquid nitrogen or liquid oxygen is then directed through the cooling coil of the substrate holder block to bring the temperature of the substrates to a temperature within the range of from about 60° to 100° K., 75° to 80° K. being preferred. Substantially pure oxygen is then introduced into the vacuum chamber and maintained at a pressure of from about 0.03 to 0.05 torr for a period of from about 5 to 30 minutes, a period of about 15 minutes being adequate.

A glow discharge is then struck between the substrate holder and an elongated electrode disposed in the vacuum chamber by applying an electric potential, great enough to cause voltage breakdown, between the electrode and the substrate holder. With oxygen pressure of 0.03 to 0.05 torr, 500 volts is sufficient.

The glow discharge current is maintained at about 0.2 to 0.3 amperes for a period of time ranging from 2 to 20 minutes, 3 to 3½ minutes being preferred. During the glow discharge, oxygen impregnates the exposed surface of the niobium. After the glow discharge is terminated, the vacuum chamber is evacuated to a pressure of about $10^{-5}$ torr.

As an option, but not necessary to the method of the invention, the temperature of the substrate may be increased to a value below 0° C. and maintained for a period of from about 1½ to 3 minutes at this temperature. The substrate is then recooled to liquid nitrogen temperature. This optional step is performed when the second conductor layer to be deposited will be less than about 2,000 angstroms thick and the duration of the glow discharge is more than 10 minutes. Without the optional step, it is possible for the second conductor layer to become a complete insulating layer if the conditions just indicated exist.

If desired, the mask may now be repositioned to define a different pattern for the second conductor layer to be deposited. For example, the second conductor may take the form of a narrow, elongated strip or layer generally perpendicular in direction to the niobium strip.

A layer of lead is next vapor deposited on the first conductor to form a second conductor by opening the shutter after the vessel containing the lead is heated to a point where the desired evaporation rate is achieved. The vapor deposition of the lead takes place with the substrate at liquid nitrogen temperature.

After the desired thickness of lead is obtained, the shutter is closed and the evaporation of the lead is terminated. The substrate is then warmed to ambient temperature and removed from the vacuum chamber.

As the substrate and the conductors which have been deposited thereon are being warmed to ambient temperature, the oxygen which has been adsorbed on the first niobium conductor layer reacts with the second lead conductor to form an insulating layer comprised of oxides of lead. Some oxides of niobium may form in a layer between the niobium and the lead oxide insulating layer but the thinness of the layer of niobium oxides makes its presence insignificant with regard to conductive oxides which may be contained therein in view of the lead oxide insulating layer.

The purpose of the substrate is to provide support for the thin conductor layers deposited thereon. However, if the first conductor is a material which is thick enough to be rigid and self-supporting, the steps of heating a substrate and depositing a first conductor layer thereon may be avoided.

While the specific example set forth above describes depositing a first conductor layer of niobium on a substrate and then a second conductor layer of lead on the niobium, other suitable metals may be used for each of the conductor layers. For example, tantalum, tungsten, chromium, lead, zirconium, molybdenum, titanium, vanadium, nickel, iron, cobalt, or the like may be vapor deposited on a substrate or utilized as a first conductor in the form of a rigid self-supporting body or plate.

The second conductor layer is preferably a metal which is more easily oxidized than the first conductor layer. The second conductor layer should also be a metal whose oxides are all electrically nonconductive. Examples of metals which meet this last requirement and which may be used satisfactorily include aluminum, magnesium, vanadium, zirconium, and lead.

It will be understood that changes and modifications may be made to the above-described invention by those skilled in the art to which the invention pertains without departing from the spirit and scope of the invention as set forth in the claims appended hereto.

What is claimed is:

1. A method of forming an electrical insulating layer comprising the steps of:
   deposition a first electrical conductor onto an electrically nonconducting substrate
   cooling said first electrical conductor to a temperature below 100° K.;
   impregnating said first conductor with oxygen; and
   depositing a second electrical conductor on said first conductor, at least one of said electrical conductors characterized by being a metal whose oxides are electrically nonconductive.

2. The method of claim 1 and including prior to depositing said second conductor the additional steps of heating said first conductor to a temperature no greater than 0° C. and recooling it to a temperature below 100° K. after said first conductor has been impregnated with oxygen.

3. The method of claim 1 wherein said first conductor is niobium and said second conductor is lead.

4. A method for forming a quantum-mechanical tunneling layer between electrical conductors comprising the steps of:
   mounting an electrically nonconducting substrate on a substrate support block in a vacuum chamber;
   depositing a first electrical conductor onto said substrate;
   cooling said first conductor to a temperature in the range of from about 60° to 100° K.;
   pressurizing said vacuum chamber with oxygen at a pressure of from about 0.03 to 0.05 Torr;
   subjecting said first conductor to said oxygen for a period of from about 5 to 30 minutes;
   establishing a glow discharge in said vacuum chamber for a period of at least 2 minutes;
   evacuating said vacuum chamber to a pressure of at least $10^{-5}$ Torr; and
   depositing a second electrical conductor on said first electrical conductor.

5. The method of claim 4 and including after said first conductor has been impregnated with oxygen the additional steps of heating said first conductor to a temperature of no greater than 0° C. and then recooling it to a temperature in the range of from about 60° K. to about 100° K. before depositing said second electrical conductor.

6. The method of claim 4 wherein said first conductor is niobium and said second conductor is lead.

7. The method of claim 4 wherein said second conductor is selected from the group consisting of aluminum, lead, magnesium, vanadium, and zirconium.

8. The method of claim 4 wherein said glow discharge is maintained at a current of from about 0.2 to 0.3 amperes for a period of from about 2 to 20 minutes.

9. The method of claim 4 wherein one of said electrical conductors is a metal whose oxides are electrically nonconductive.

10. The method of claim 4 wherein said second electrical conductor is a metal whose oxides are electrically nonconductive and which oxidizes more readily than said first electrical conductor.

11. The method of claim 4 wherein the first step comprises further
   evacuating said vacuum chamber to at least $7\times10^{-8}$ Torr.

12. The method of claim 11 wherein said glow discharge is established by applying a difference in potential of at least 400 volts between said substrate holder and an elongated electrode disposed in said vacuum chamber.

13. The method of claim 11 wherein said first electrical conductor layer is niobium and including the steps of heating the substrate to a temperature in the range of from about 350° to 500° C., then vapor depositing said first electrical conductor layer on said substrate.

14. The method of claim 13 wherein said second electrical conductor is lead and said first conductor is subjected to said oxygen for a period of about 15 minutes.

15. The method of claim 14 wherein the period of said glow discharge is about 3.5 minutes.

16. The method of claim 15 wherein said first conductor is maintained at a temperature of from about 75° K. to about 80° K. until the second conductor layer is deposited.

17. The article produced by the method of claim 1.

* * * * *